US012717831B2

(12) United States Patent
Sengar et al.

(10) Patent No.: US 12,717,831 B2
(45) Date of Patent: Aug. 25, 2026

(54) TRANSCRIPT SEGMENTATION AND SUMMARIZATION

(71) Applicant: Capital One Services, LLC, McLean, VA (US)

(72) Inventors: Shaktimaan Singh Sengar, Bengaluru (IN); Prashanta Saha, Bangalore (IN); Joydeep Dasgupta, Bangalore (IN); Sanjay K. Sunny, Kottayam (IN); Arun Kaushik Narmadha Ramesh, Neyveli (IN)

(73) Assignee: Capital One Services, LLC, McLean, VA (US)

( * ) Notice: Subject to any disclaimer, the term of this patent is extended or adjusted under 35 U.S.C. 154(b) by 132 days.

(21) Appl. No.: 18/613,237

(22) Filed: Mar. 22, 2024

(65) Prior Publication Data

US 2025/0298829 A1 Sep. 25, 2025

(51) Int. Cl.
*G06F 16/383* (2019.01)
*G06F 16/34* (2019.01)
*G06F 40/284* (2020.01)

(52) U.S. Cl.
CPC .......... *G06F 16/345* (2019.01); *G06F 40/284* (2020.01)

(58) Field of Classification Search
CPC ......... G10L 15/26; G10L 15/01; G10L 25/60; G10L 5/22
See application file for complete search history.

(56) References Cited

U.S. PATENT DOCUMENTS

2013/0144607 A1* 6/2013 Weber ..................... G10L 25/57 704/9
2020/0126538 A1* 4/2020 Han ...................... G10L 15/063
2020/0357408 A1* 11/2020 Boekweg ................ G10L 15/26
2021/0043211 A1* 2/2021 Leidner ................... G10L 15/26
2021/0084145 A1* 3/2021 Pham .................. H04M 3/5175
2022/0109585 A1* 4/2022 Asthana ................ G06F 40/289
2022/0222437 A1* 7/2022 Lauber ................. G06N 3/0499
2023/0153451 A1* 5/2023 Malhotra ............ G06F 21/6245 726/26
2023/0222149 A1* 7/2023 Dell ........................ G06N 7/01 715/254
2023/0297765 A1* 9/2023 Vendrow ................. G10L 15/22 704/251
2023/0359828 A1* 11/2023 Higo ..................... G06F 40/295
2024/0086461 A1* 3/2024 Varakin ................... G06F 40/35
2024/0177084 A1* 5/2024 Liu ................ G06Q 10/063112
(Continued)

*Primary Examiner* — Olujimi A Adesanya
(74) *Attorney, Agent, or Firm* — Harrity & Harrity, LLP

(57) ABSTRACT

In some implementations, a device may obtain a transcript that includes a plurality of utterances. The device may determine that the transcript includes a quantity of tokens that is greater than a threshold quantity of tokens, wherein each token of the quantity of tokens corresponds to a word or a portion of a word included in the plurality of utterances. The device may generate a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances. The device may generate a transcript summary based on the plurality of overlapping transcript portions.

20 Claims, 8 Drawing Sheets

(56) References Cited

U.S. PATENT DOCUMENTS

| | | | | |
|---|---|---|---|---|
| 2024/0205520 | A1* | 6/2024 | Carbajo | G10L 15/26 |
| 2024/0340193 | A1* | 10/2024 | Zhu | G10L 15/26 |
| 2024/0419912 | A1* | 12/2024 | Somech | G06N 3/044 |
| 2025/0061291 | A1* | 2/2025 | Gardner | G06F 40/56 |
| 2025/0190476 | A1* | 6/2025 | Ramamohan | G06F 16/355 |
| 2025/0260790 | A1* | 8/2025 | Giovanardi | G06Q 10/10 |
| 2025/0284729 | A1* | 9/2025 | Farnan | G06F 16/3322 |
| 2025/0298829 | A1* | 9/2025 | Sengar | G06F 40/284 |

* cited by examiner

TRANSCRIPT SEGMENTATION AND SUMMARIZATION

BACKGROUND

A transcript may be generated based on conversation between two or more people. In some cases, the transcript may be generated based on audio file associated with a telephone call between an agent and a customer. The transcript may be generated using speech-to-text technology that automatically transcribes the audio associated with the telephone call, for example, using artificial intelligence and machine learning algorithms. Transcribing the audio may include converting the spoken words into text using speech-to-text software. The transcribing may occur in real-time (for example, during the telephone call) or may occur using a recording of the telephone call. An accuracy of the transcription may vary based on a number of factors, such as a quality of the recording, a clarity of the speech, a type of technology used for transcribing, and/or a presence or absence of background noise.

SUMMARY

Some implementations described herein relate to a system for transcript segmentation and summarization. The system may include one or more memories and one or more processors communicatively coupled to the one or more memories. The one or more processors may be configured to obtain a transcript that includes a plurality of utterances. The one or more processors may be configured to determine that the transcript includes a quantity of tokens that is greater than a threshold quantity of tokens, wherein each token of the quantity of tokens corresponds to a word or a portion of a word included in the plurality of utterances. The one or more processors may be configured to generate a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances. The one or more processors may be configured to generate a transcript summary based on the plurality of overlapping transcript portions.

Some implementations described herein relate to a method for transcript segmentation and summarization. The method may include obtaining a transcript that includes a plurality of utterances. The method may include determining that the transcript includes a quantity of tokens that is greater than a threshold quantity of tokens, wherein each token of the quantity of tokens corresponds to a word or a portion of a word included in the plurality of utterances. The method may include generating a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances. The method may include generating a transcript summary based on the plurality of overlapping transcript portions.

Some implementations described herein relate to a non-transitory computer-readable medium that stores a set of instructions. The set of instructions, when executed by one or more processors of a device, may cause the device to obtain a transcript that includes a plurality of utterances. The set of instructions, when executed by one or more processors of the device, may cause the device to determine that the transcript includes a quantity of tokens that is greater than a threshold quantity of tokens, wherein each token of the quantity of tokens corresponds to a word or a portion of a word included in the plurality of utterances. The set of instructions, when executed by one or more processors of the device, may cause the device to generate a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances. The set of instructions, when executed by one or more processors of the device, may cause the device to generate a transcript summary based on the plurality of overlapping transcript portions.

DETAILED DESCRIPTION

Figure 1A:
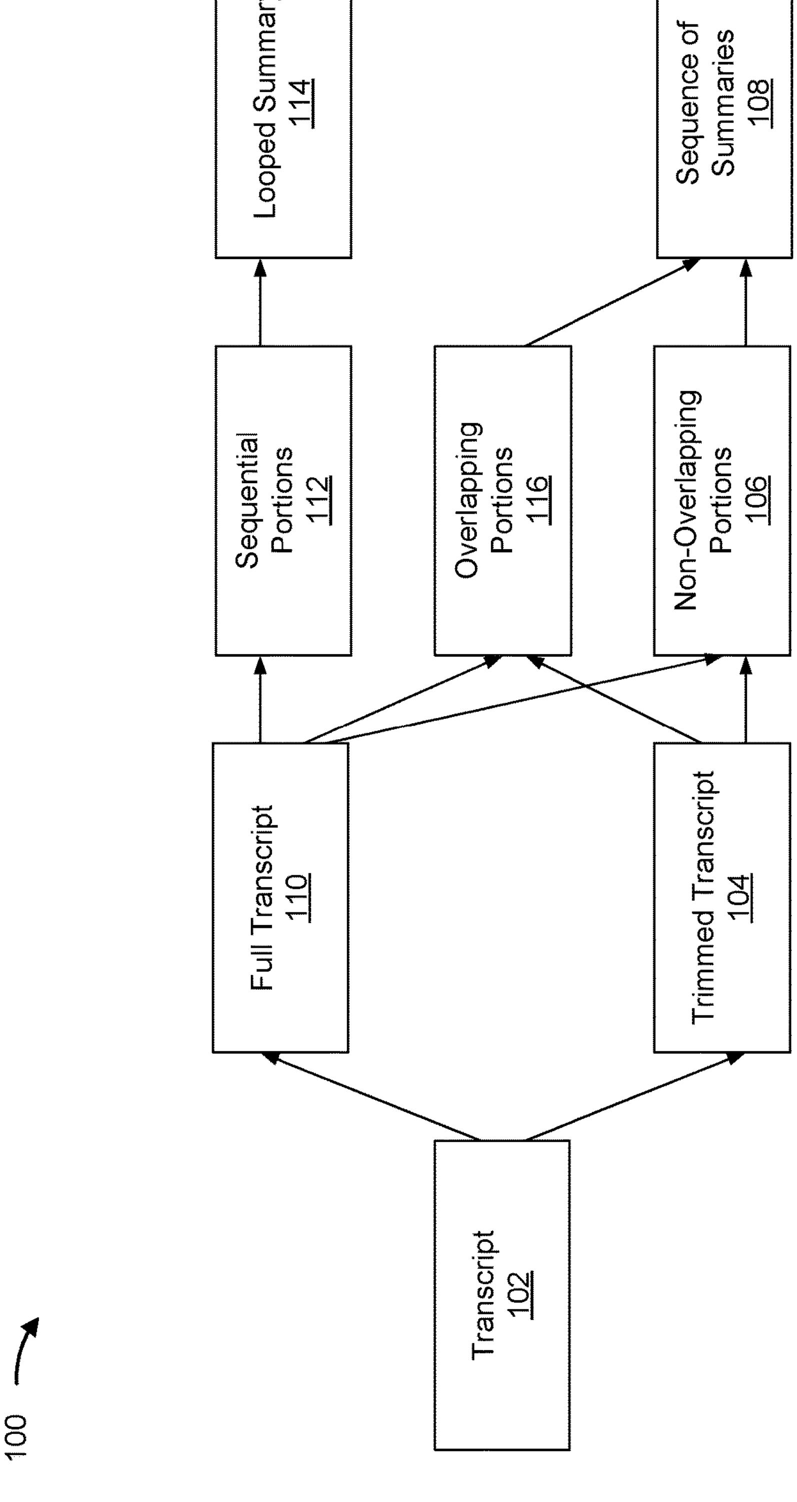
FIGS. 1A-1E are diagrams illustrating examples of transcript segmentation and summarization, in accordance with some embodiments of the present disclosure.

The following detailed description of example implementations refers to the accompanying drawings. The same reference numbers in different drawings may identify the same or similar elements.

Listening to a recording of a telephone call may enable improved recollection of the telephone call. However, listening to the recording of the telephone call may be a long and tedious process. For example, an agent that is serving a customer may need to listen to a recording of a telephone call having a long duration (for example, ten minutes or longer) in order to improve the agent recollection of the telephone call. In some examples, the agent may take notes in an effort to capture the important topics discussed during the telephone call. However, notes may not be available for all calls, and even if the notes are available for a particular call, the notes may not be comprehensive, may not be easily understood by others, and/or may be based on an improper understanding of the call by the agent.

In some examples, a transcript of the telephone call may be generated based on audio (for example, an audio file) associated with the telephone call. The transcript may be generated using speech-to-text technology that automatically transcribes the audio associated with the telephone call, for example, using artificial intelligence (AI) and machine learning (ML) (collectively, AI/ML) algorithms. Transcribing the audio may include converting the spoken words into text using speech-to-text software. In some examples, summaries of the telephone call or the call transcript may be generated in order to allow a user to more quickly obtain an understanding of the telephone call. However, numerous problems may occur when generating call transcript summaries. For example, the call transcript summary may still have a long length (such as hundreds or thousands of words), which may not enable the user to quickly gain an understanding of the telephone call. Additionally, or alternatively, the call transcript summary may not be comprehensive, which may lead to important topics not being summarized in the call transcript summary. In some examples, there may be limits on an amount of text that can be used to generate the call transcript summary. For example, the call transcript may be longer than an input limit for a model (such as a speech-to-text model and/or an AI/ML model). In this case, a device performing the call transcript summary may break the call transcript into multiple call transcript portions and may generate a call transcript summary based on the multiple call transcript portions.

However, this may result in the call transcript summary being unclear or not comprehensive since there may not be any context between the multiple call transcript portions. Alternatively, the device performing the call transcript summary may provide context for each iteration of the call transcript in order to generate a call transcript summary that is more comprehensive. For example, a device that is generating a call transcript summary based on three separate call transcript portions may need to generate a first call transcript summary based on a first call transcript portion, generate first context information associated with the first call transcript summary, generate a second call transcript summary based on a second call transcript portion and the first context information, generate second context information associated with the second call transcript summary, and generate a third call transcript summary based on the third call transcript portion and the second context information. This may require a large quantity of processing resources and/or memory resources of the device.

Some implementations described herein enable transcript segmentation and summarization. A device may obtain a transcript (such as a call transcript) that includes a plurality of utterances. As used herein, "transcript" may refer to any record or text. For example, a transcript may be a record of a plurality of utterances spoken by one or more people. For example, a transcript may be of a transcript of one or more calls (e.g., phone calls, such as call(s) between a user and one or more agents), and/or a meeting, among other examples. The device may determine that that the transcript includes a quantity of tokens that is greater than a threshold quantity of tokens (for example, greater than 512 tokens), where each token of the quantity of tokens corresponds to a word or a portion of a word included in the plurality of utterances. The device may generate a plurality of overlapping transcript portions. Each transcript portion of the plurality of overlapping transcript portions may overlap with at least one other transcript portion of the plurality of overlapping transcript portions. For example, the device may split the transcript into a first transcript portion, a second transcript portion, and a third transcript portion, where the first transcript portion and the second transcript portion partially overlap (for example, by 25 percent) and the second transcript portion and the third transcript portion partially overlap (for example, by 25 percent). The device may generate a transcript summary that is based on the plurality of overlapping transcript portions. This may enable the device to generate a transcript summary that is comprehensive and is not overly long. In particular, this may enable the device to generate a transcript summary using a plurality of overlapping transcript portions, where each transcript portion provides context for at least one other overlapping transcript portion, while reducing the quantity of processing and/or memory resources required by the device for generating the transcript summary. Additional details are described below.

FIGS. 1A-1E are diagrams illustrating examples of transcript segmentation and summarization. The examples may be performed by a device such as the user device 205, the entity device 210 and/or the processing device 215 described in connection with FIG. 2.

As shown in FIG. 1A and example 100, the device may obtain a transcript 102. The transcript 102 may be, for example, a transcript of a telephone call, such as a telephone call between an agent and a customer. The transcript may have any length, but in some examples, may have a long length (such as thousands of words) due to a duration of the telephone call being many minutes.

In a first example, the device may obtain and/or generate a trimmed transcript 104. The trimmed transcript 104 may include at least a portion of the transcript 102, such as a portion of the transcript 102 that includes one or more important or relevant topics. The device may generate a plurality of non-overlapping portions 106 based on the trimmed transcript 104, and may generate a sequence of summaries 108 based on the plurality of non-overlapping portions 106. However, as described herein, the sequence of summaries 108 may not be comprehensive on an individual level and/or may be overly-long when combined. Additionally, or alternatively, the sequence of summaries 108 may be based on a plurality of non-overlapping portions without providing context between the plurality of non-overlapping portions, which may result in the sequence of summaries 108 being unclear.

In a second example, the device may obtain and/or generate a full transcript 110. The full transcript 110 may be similar or identical to the transcript 102. For example, the full transcript 110 may include all of the relevant text from the telephone call that is captured by the transcript 102. The device may generate a plurality of sequential portions 112, and may generate a looped summary 114 based on the plurality of sequential portions 112. In one example, the device may split the full transcript 110 into a first sequential portion 112-1, a second sequential portion 112-2, and a third sequential portion 112-3. To generate the looped summary 114, the device may need to generate a first transcript summary based on the first sequential portion 112-1, generate first context information associated with the first transcript summary, generate a second transcript summary based on the second sequential portion 112-2 and the first context information, generate second context information associated with the second transcript summary, and generate a third (for example, final) transcript summary based on the third sequential portion 112-3 and the second context information. This may require a large quantity of processing resources and/or memory resources of the device.

In a third example, the device may generate a plurality of overlapping portions 116 based on the trimmed transcript 104 and/or the full transcript 110. This may enable the device to generate a transcript summary that is comprehensive without being overly long, and while reducing the quantity of processing resources and/or memory resources required by the device. Additional details regarding these features are described below.

Figure 1B:
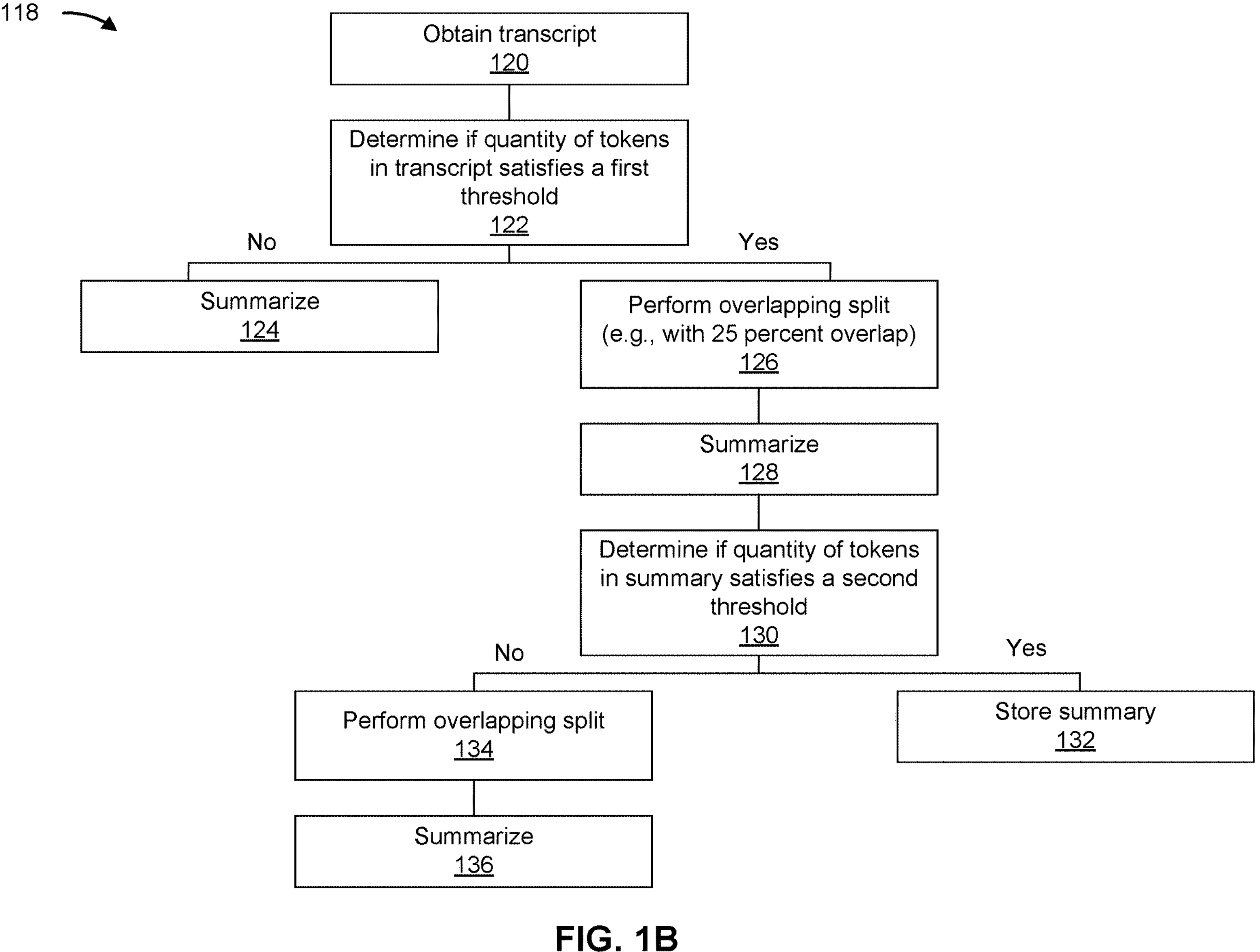

As shown in FIG. 1B and example 118, the device may generate a plurality of overlapping transcript portions. As shown by reference number 120, the device may obtain the transcript. In some examples, the device may generate the transcript, for example, based on a recording of a telephone call between an agent and a customer. In some other examples, another device may generate the transcript, and the device may receive the transcript from the other device. As shown by reference number 122, the device may determine whether the quantity of tokens included in the transcript satisfies a first threshold. For example, the device may determine whether the quantity of tokens in the transcript is greater than or equal to 512 tokens. A token may correspond to a single word, a portion of a word, or multiple words (for example, a phrase) included in the transcript. As shown by reference number 124, if the quantity of tokens in the transcript does not satisfy the first threshold (for example, if the quantity of tokens is less than 512 tokens), the device may summarize the transcript. As shown by reference number 126, if the quantity of tokens satisfies the first threshold (for example, if the quantity of tokens is greater than or equal to 512 tokens), the device may perform an overlapping split for the transcript, such as an overlapping split with a 25 percent overlap. Performing the overlapping split may include generating a plurality of transcript portions, where each transcript portion of the plurality of transcript portions overlaps with at least one other transcript portion of the plurality of transcript portions by 25 percent (or approximately 25 percent, such as between 20 percent and 30 percent). Each transcript portion may include a quantity of tokens that is less than (or less than or equal to) 512 tokens and that is greater than (or greater than or equal to) 28 tokens. In some examples, a transcript portion may overlap with another transcript portion if the transcript portion and the other transcript portion include the same tokens and/or utterances. For example, a transcript portion may overlap with another transcript portion by 25 percent if the transcript portion includes 25 percent of the tokens and/or utterances included in the other transcript portion. As shown by reference number 128, the device may summarize the transcript based on the plurality of transcript portions. For example, the device may generate a first transcript summary based on the plurality of transcript portions.

As shown by reference number 130, the device may determine whether the quantity of tokens included in the summary (for example, the first summary) satisfies a second threshold. For example, the device may determine whether the quantity of tokens included the summary is less than or equal to 250 tokens. As shown by reference number 132, if the quantity of tokens in the summary satisfies the second threshold (for example, if the quantity of tokens is less than or equal to 250 tokens), the device may store the summary (for example, may use the summary). As shown by reference number 134, if the quantity of tokens in the summary does not satisfy the second threshold (for example, if the quantity of tokens is greater than 250 tokens), the device may perform an overlapping split for the summary. Performing the overlapping split for the summary may include generating a plurality of transcript portions based on the first summary. In some examples, the device may split the summary into a given quantity of portions, such as three portions, four portions, or another quantity of portions (e.g., where each portion has some overlap). For example, the device may split the summary into a defined quantity of portions or into a quantity of portions that is less than or equal to a threshold. The device may split and summarize the portions in a similar manner as described elsewhere herein. As shown by reference number 136, the device may summarize the transcript based on the overlapping split performed for the summary. For example, the device may generate a second summary based on the plurality of overlapping splits associated with the first summary (e.g., based on the portions of the first summary, as described above).

Figure 1C:
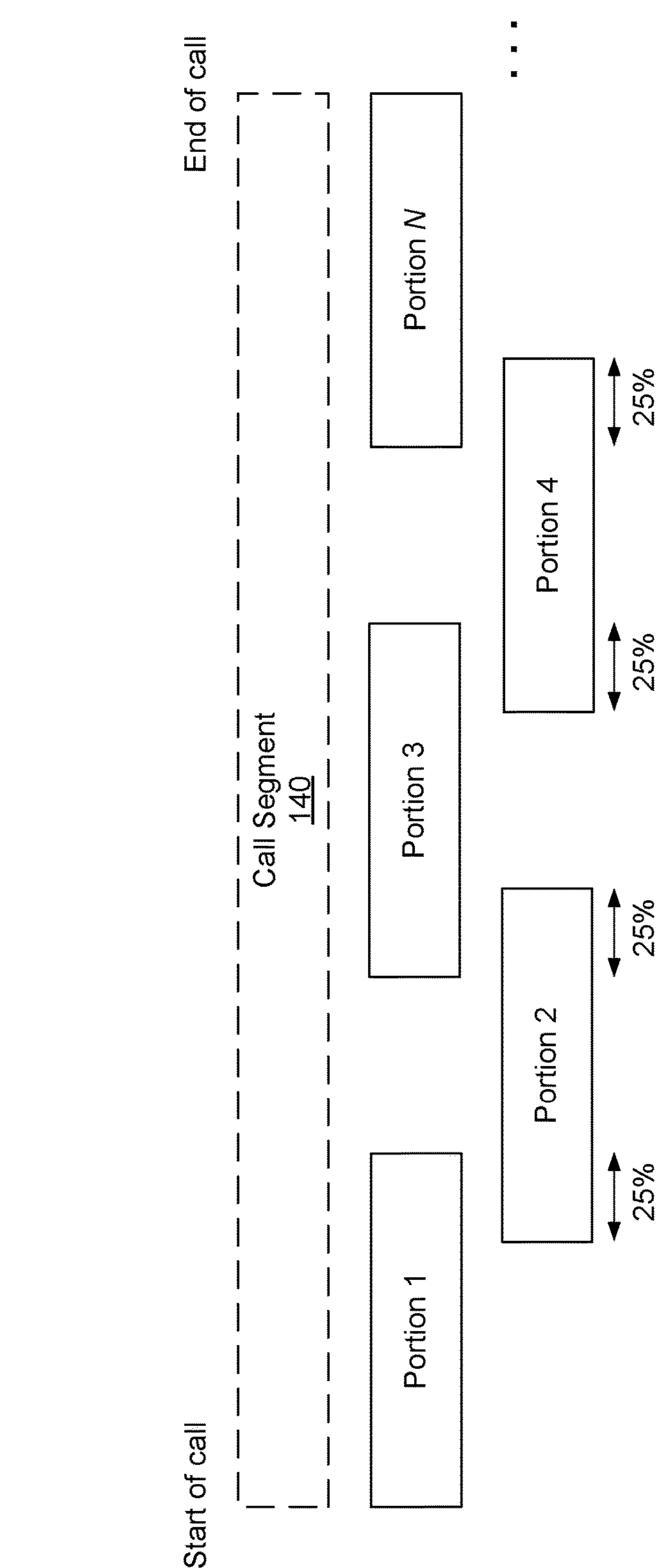

As shown in FIG. 1C and by reference number 138, the device may obtain and/or generate a call segment 140. The call segment 140 may correspond to a portion of the call transcript (e.g., transcript 102) or may correspond to an entirety of the call transcript. The call segment 140 may begin at a start of the call associated with the call transcript or may begin at a time that is shortly after the start of the call associated with the call transcript. The call segment 140 may terminate at an end of the call associated with the call transcript or may terminate at a time that is shortly before the end of the call associated with the call transcript. The device may generate a plurality of call transcript portions based on the call segment 140. The plurality of call transcript portions may correspond to the plurality of overlapping transcript portions described herein. As shown, the device may generate a first portion (Portion 1), a second portion (Portion 2), a third portion (Portion 3), a fourth portion (Portion 4), and so on to an $N^{th}$ portion (Portion N) based on the call segment 140. While the call segment 140 is shown as being divided into five portions, the call segment may be divided into any quantity of portions (for example, two or more portions). Portion 1 and Portion 2 may overlap by 25 percent (or approximately 25 percent). For example, a last 25 percent of the text included in Portion 1 and a first 25 percent of the text included in Portion 2 may include the same text (e.g., the same tokens, words, and/or utterances) from the call transcript. Similarly, Portion 2 and Portion 3 may overlap by 25 percent (or approximately 25 percent), Portion 3 and Portion 4 may overlap by 25 percent (or approximately 25 percent), and Portion 4 and Portion N may overlap by 25 percent (or approximately 25 percent). In some implementations, an end of a portion may correspond to an end of an utterance. For example, each portion of the plurality of portions may conclude at an end of an utterance included in the call transcript. The device may generate the portions such that each portion includes a quantity of tokens that satisfies (e.g., is less than or equal to) a portion threshold. The threshold may be an input threshold for a model.

Figure 1D:
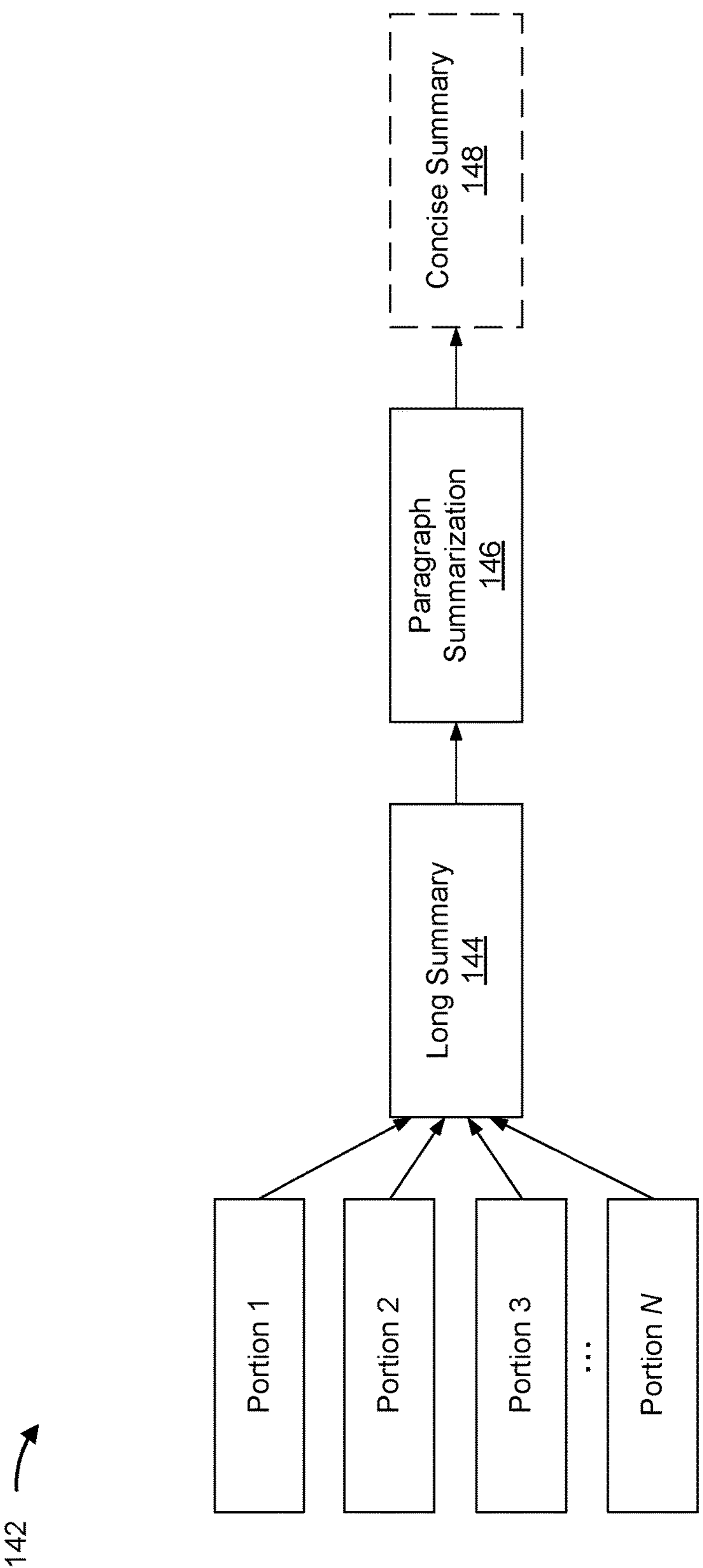

As shown in FIG. 1D and example 142, the device may generate a long summary based on a plurality of transcript portions. In some cases, a length of a call transcript summary may be proportional to a length of the corresponding call transcript. For example, a shorter call transcript (for example, two pages) may result in a shorter call transcript summary (for example, four sentences), whereas a long call transcript (for example, ten pages) may result in a longer call transcript summary (for example, twenty sentences). Longer summaries may be difficult for the user to read and comprehend, particularly in a short period of time. In some examples, the device may generate a long summary 144 based on a Portion 1, Portion 2, Portion 3, and so on to a Portion N of the call transcript. The device may generate a paragraph summary 146 based on the long summary 144. In some cases, a concise summary (for example, a short summary) may not be comprehensive enough to summarize all important points of the call. The device may use paragraph summarization to generate a paragraph summary 146 having a target length. For example, the device may use paragraph summarization to generate a paragraph summary that is between 70 tokens and 230 tokens. In some examples, the target length may be approximately 230 tokens, which may be easy to read while being both concise and comprehensive. In some examples, the device may generate a concise summary 148 based on the paragraph summary 146. However, the concise summary 148 may be too concise and may not include one or more key points from the long summary 144. Additionally, the long summary 144 may include a quantity of tokens that does not satisfy a threshold, such as an input threshold for a model used to summarize.

Figure 1E:
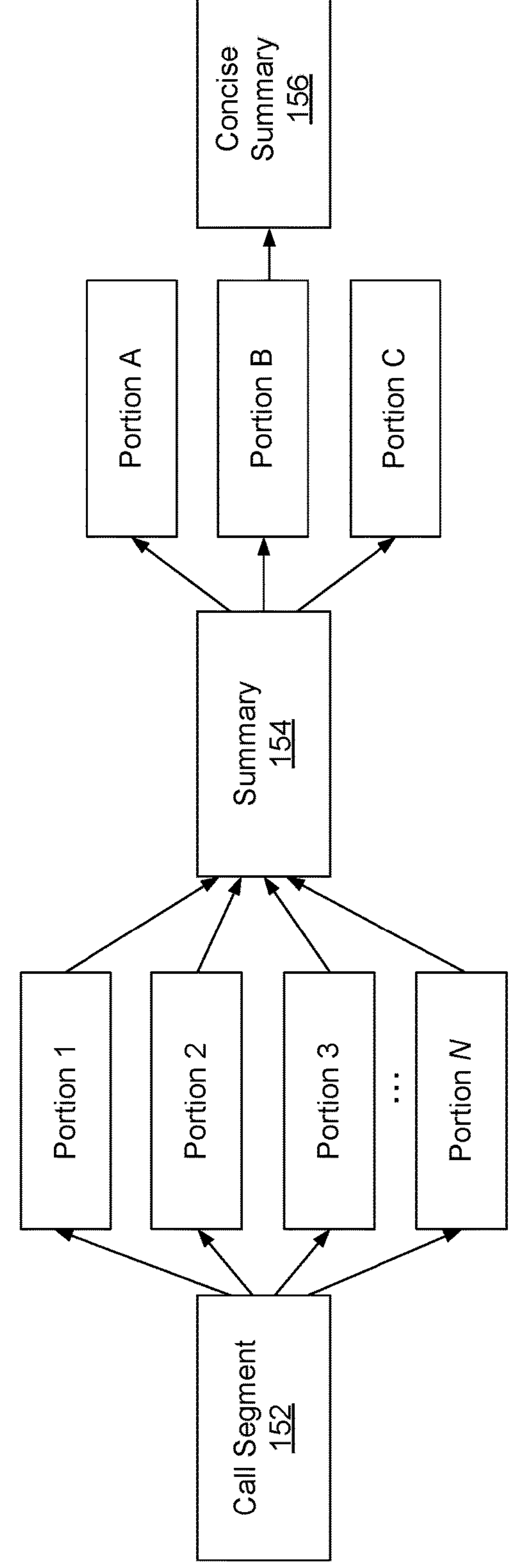

Therefore, as shown in FIG. 1E and example 150, multiple iterations may be performed to generate the call transcript summary. The device may obtain and/or generate a call segment 152. The call segment 152 may correspond to a portion of the call transcript (e.g., transcript 102) or may correspond to an entirety of the call transcript. The device may generate a plurality of call transcript portions based on the call transcript. For example, as described above, the device may generate a plurality of overlapping portions (Portion 1, Portion 2, Portion 3, Portion 4, and so on to a Portion N) based on the call transcript and using a 25 percent overlapping split. Although some examples are depicted and described showing five portions (e.g., N equal to 5), the techniques and implementations described herein are similarly applicable to any quantity of portions. The device may generate a summary 154 based on the plurality of overlapping portions of the call transcript. In some examples, the summary 154 may have a target length and may be concise and comprehensive. For example, the summary 154 may include approximately 180 tokens. In some other examples, the summary 154 may have a length that is longer than a target length (e.g., the target length may be included in a range from 180 tokens to 250 tokens). For example, the summary 154 may include a quantity of tokens that is greater than 250 tokens. The device may generate a plurality of overlapping portions based on the summary 154. For example, the device may generate Portion A, Portion B, and Portion C based on the summary 154. In one example, the device may generate Portion A, Portion B, and Portion C using a 75 percent overlapping split. The device may generate a concise summary 156 (for example, having a quantity of tokens that is less than or equal to 250 tokens) based on Portion A, Portion B, and Portion C. By splitting the summary 154 into portions and summarizing each portion, the device may ensure that the concise summary 156 includes all key points from the summary 154.

As described herein, the device may use overlapping splits to generate call transcript summaries that are easy to read, comprehensive, coherent, and tonally similar to the corresponding call transcript. This may enable the device to summarize calls of any duration and to restrict the call transcript summary length while maintaining quality metrics. The transcript summarization techniques may be used to summarize meetings between two or more people of any length (e.g., without modifications). Additionally, the transcript summarization techniques may be used to summarize a continued customer interaction based on a sequence of call transcripts.

As indicated above, FIGS. 1A-1E are provided as an example. Other examples may differ from what is described with regard to FIGS. 1A-1E.

Figure 2:
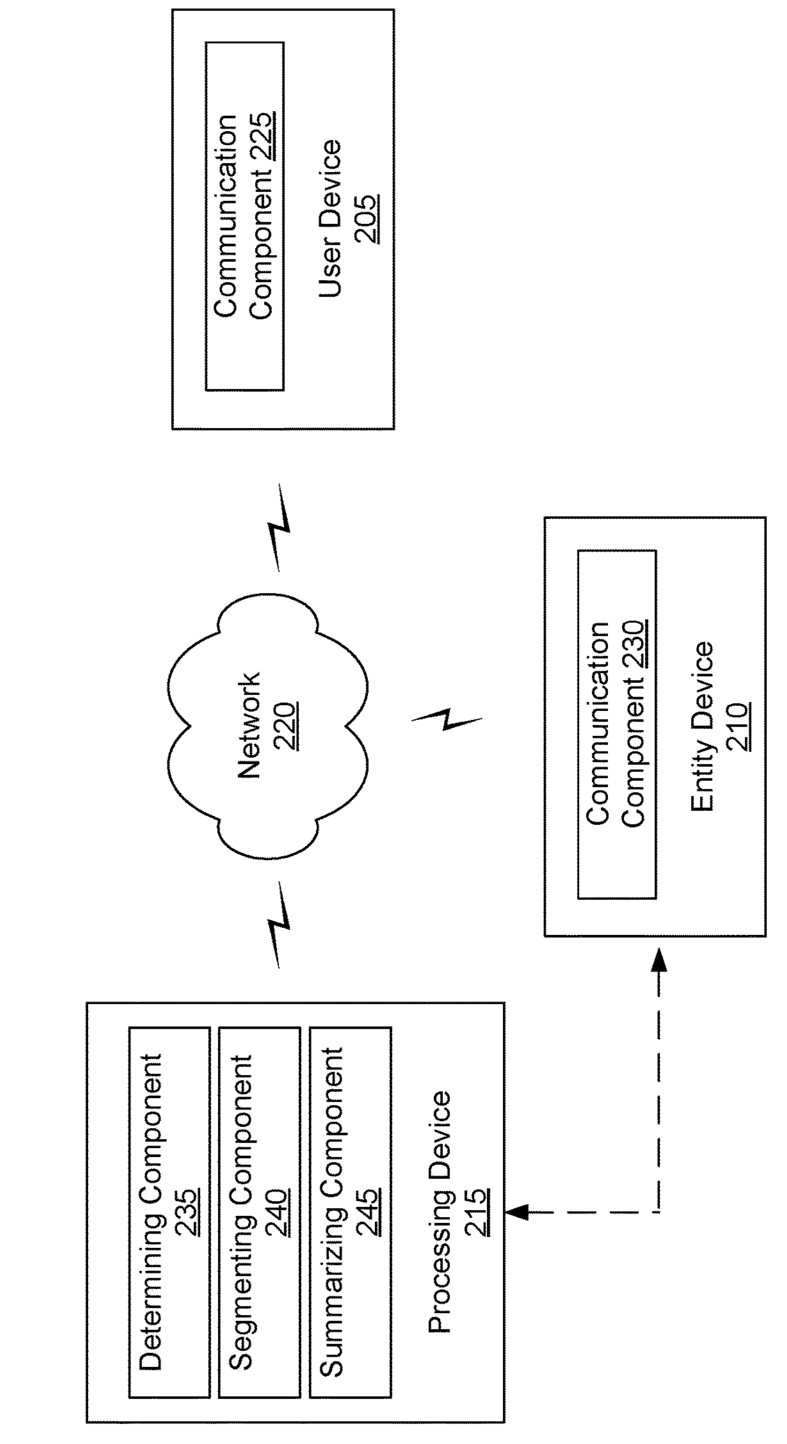
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 205, an entity device 210, a processing device 215, and a network 220. The processing device 215 may be included in the user device 205, the entity device 210, or may be included in another device that communicates with the user device 205 and/or the entity device 210.

The network 220 may include wired connections, wireless connections, or a combination of wired and wireless connections. The network 220 may include one or more wired and/or wireless networks. For example, the network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The user device 205 may communicate using a communication component 225 associated with the user device 205. In some examples, the user device 205 may be associated with a user (such as a customer) that utters one or more utterances included in the transcript. The user device 205 may communicate with the entity device 210 and/or the processing device 215 via the network 220. For example, the user device 205 may be a wireless device that communicates with the entity device 210 via a wireless network associated with the network 220.

The entity device 210 may communicate using a communication component 230 associated with the entity device 210. In some examples, the entity device 210 may be associated with a user (such as an agent) that utters one or more utterances included in the transcript. The entity device 210 may communicate with the user device 205 and/or the processing device 215 via the network 220. For example, the entity device 210 may be a wireless device that communicates with the user device 205 via a wireless network associated with the network 220.

The processing device 215 may include a determining component 235, a segmenting component 240, and/or a summarizing component 245. The determining component 235 may be configured to determine whether a transcript (or a portion of a transcript) includes a quantity of tokens that satisfies a threshold. For example, the determining component 235 may determine whether a transcript includes a quantity of tokens that is greater than or equal to a first threshold (for example, 512 tokens) and/or may determine whether summary of the transcript includes a quantity of tokens that is less than or equal to a second threshold (for example, 250 tokens). The segmenting component 240 may be configured to segment the transcript into a plurality of portions. For example, the segmenting component 240 may generate a plurality of overlapping transcript portions. The summarizing component 245 may be configured to summarize the transcript based on the plurality of overlapping transcript portions. Additional details regarding these features are described in connection with FIGS. 1A-1E.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
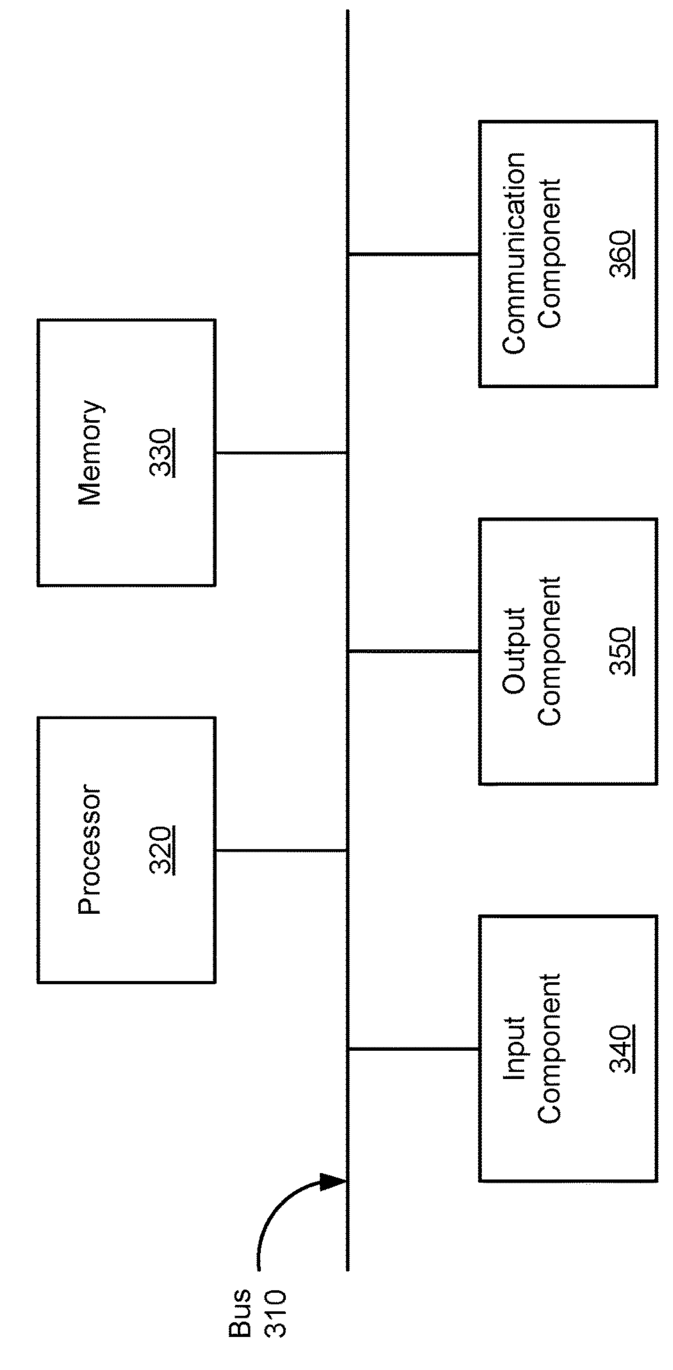
FIG. 3 is a diagram of example components of a device associated with transcript segmentation and summarization, in accordance with some embodiments of the present disclosure.

FIG. 3 is a diagram of example components of a device 300 associated with transcript segmentation and summarization. In some implementations, the device 300 may correspond to the processing device 215. Additionally, or alternatively, the processing device 215 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
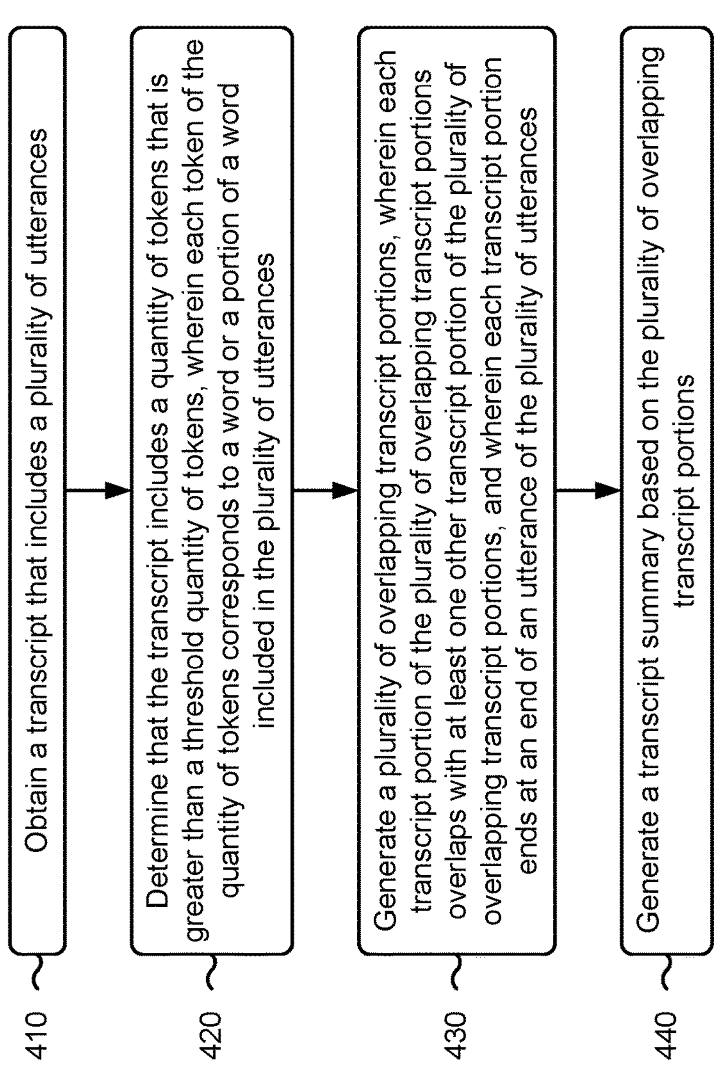
FIG. 4 is a flowchart of an example process associated with transcript segmentation and summarization, in accordance with some embodiments of the present disclosure.

FIG. 4 is a flowchart of an example process 400 associated with transcript segmentation and summarization. In some implementations, one or more process blocks of FIG. 4 may be performed by the processing device 215. In some implementations, one or more process blocks of FIG. 4 may be performed by another device or a group of devices separate from or including the processing device 215, such as the user device 205 and/or the entity device 210. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a transcript that includes a plurality of utterances (block 410). For example, the processing device 215 (e.g., using processor 320 and/or memory 330) may obtain a transcript that includes a plurality of utterances, as described above in connection with reference number 120 of FIG. 1B. As an example, the processing device 215 may obtain a transcript that includes a plurality of utterances between an agent and a customer.

As further shown in FIG. 4, process 400 may include determining that the transcript includes a quantity of tokens that is greater than a threshold quantity of tokens. In some implementations, each token of the quantity of tokens corresponds to a word or a portion of a word included in the plurality of utterances (block 420). For example, the processing device 215 (e.g., using processor 320 and/or memory 330) may determine that the transcript includes a quantity of tokens that is greater than a threshold quantity of tokens, as described above in connection with reference number 122 of FIG. 1B. As an example, the processing device 215 may determine that the transcript includes a quantity of tokens that is greater than or equal to 512 tokens.

As further shown in FIG. 4, process 400 may include generating a plurality of overlapping transcript portions. In some implementations, each transcript portion of the plurality of overlapping transcript portions overlaps with at least one other transcript portion of the plurality of overlapping transcript portions, and each transcript portion ends at an end of an utterance of the plurality of utterances (block 430). For example, the processing device 215 (e.g., using processor 320 and/or memory 330) may generate a plurality of overlapping transcript portions, as described above in connection with reference number 126 of FIG. 1B. As an example, the processing device 215 may generate a plurality of transcript portions, where each transcript portion overlaps with at least one other transcript portion by 25 percent.

As further shown in FIG. 4, process 400 may include generating a transcript summary based on the plurality of overlapping transcript portions (block 440). For example, the processing device 215 (e.g., using processor 320 and/or memory 330) may generate a transcript summary based on the plurality of overlapping transcript portions, as described above in connection with reference number 128 of FIG. 1B.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for transcript segmentation and summarization, the system comprising:

one or more memories; and one or more processors, communicatively coupled to the one or more memories, configured to:

generate a transcript that includes a plurality of utterances;

determine that the transcript includes a quantity of tokens that is greater than a threshold quantity of tokens for input into a summarization model, wherein each token of the quantity of tokens corresponds to a word or a portion of a word included in the plurality of utterances;

generate, based on the threshold quantity of tokens, a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances;

generate, using the summarization model, a transcript summary based on the plurality of overlapping transcript portions;

determine that the transcript summary includes a quantity of tokens that is greater than a second threshold quantity of tokens;

perform, using the summarization model, paragraph summarization for the transcript summary; and generate, using the summarization model, a second transcript summary based on performing the paragraph summarization for the transcript summary, wherein the second transcript summary includes a quantity of tokens that is less than the quantity of tokens included in the transcript summary.

2. The system of claim 1, wherein the threshold quantity of tokens is 512 tokens, and wherein each transcript portion of the plurality of overlapping transcript portions includes at least 28 tokens and less than or equal to 512 tokens.

3. The system of claim 1, wherein each transcript portion of the plurality of overlapping transcript portions overlaps with at least one other transcript portions of the plurality of overlapping transcript portions by 25 percent.

4. The system of claim 1, wherein the one or more processors are further configured to:

determine that the second transcript summary includes a quantity of tokens that is greater than the second threshold quantity of tokens or a third threshold quantity of tokens;

perform paragraph summarization for the second transcript summary; and generate a third transcript summary based on performing the paragraph summarization for the second transcript summary, wherein the third transcript summary includes a quantity of tokens that is less than the quantity of tokens included in the second transcript summary.

5. The system of claim 1, wherein the one or more processors are further configured to identify a target quantity of tokens to be included in the transcript summary, wherein the one or more processors, to generate the transcript summary based on the plurality of overlapping transcript portions, are configured to generate the transcript summary based on the plurality of overlapping transcript portions and the target quantity of tokens.

6. The system of claim 5, wherein the target quantity of tokens is between 70 and 230 tokens.

7. The system of claim 5, wherein the one or more processors are further configured to:

generate a second plurality of overlapping transcript portions, wherein each transcript portion of the second plurality of overlapping transcript portions overlaps with at least one other transcript portion of the second plurality of overlapping transcript portions; and generate the second transcript summary based on the second plurality of overlapping transcript portions.

8. The system of claim 7, wherein the second threshold quantity of tokens is included in a range from 180 to 250 tokens.

9. The system of claim 7, wherein a quantity of the second plurality of overlapping transcript portions satisfies a portion threshold.

10. The system of claim 1, wherein the one or more processors are further configured to:

store the transcript summary prior to determining that the transcript summary includes a quantity of tokens that is greater than the second threshold quantity of tokens.

11. The system of claim 1, wherein the one or more processors are further configured to:

generate the plurality of overlapping transcript portions such that each transcript portion includes a quantity of tokens that is less than or equal to an input threshold for a model used to generate the transcript summary.

12. A method for transcript segmentation and summarization, comprising:

generating a transcript that includes a plurality of utterances;

determining that the transcript includes a quantity of tokens that is greater than a threshold quantity of tokens for input into a summarization model, wherein each token of the quantity of tokens corresponds to a word or a portion of a word included in the plurality of utterances;

generating, based on the threshold quantity of tokens, a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances;

generating, using the summarization model, a transcript summary based on the plurality of overlapping transcript portions;

determining that the transcript summary includes a quantity of tokens that is greater than a second threshold quantity of tokens;

performing, using the summarization model, paragraph summarization for the transcript summary; and generating, using the summarization model, a second transcript summary based on performing the paragraph summarization for the transcript summary, wherein the second transcript summary includes a quantity of tokens that is less than the quantity of tokens included in the transcript summary.

13. The method of claim 12, further comprising:

determining that the second transcript summary includes a quantity of tokens that is greater than the second threshold quantity of tokens or a third threshold quantity of tokens;

performing paragraph summarization for the second transcript summary; and generating a third transcript summary based on performing the paragraph summarization for the second transcript summary, wherein the third transcript summary includes a quantity of tokens that is less than the quantity of tokens included in the second transcript summary.

14. The method of claim 12, further comprising identifying a target quantity of tokens to be included in the transcript summary, wherein generating the transcript summary based on the plurality of overlapping transcript portions comprises generating the transcript summary based on the plurality of overlapping transcript portions and the target quantity of tokens.

15. The method of claim 14, further comprising:

generating a second plurality of overlapping transcript portions, wherein each transcript portion of the second plurality of overlapping transcript portions overlaps with at least one other transcript portion of the second plurality of overlapping transcript portions; and generating the second transcript summary based on the second plurality of overlapping transcript portions.

16. The method of claim 12, further comprising:

storing the transcript summary prior to determining that the transcript summary includes a quantity of tokens that is greater than the second threshold quantity of tokens.

17. A non-transitory computer-readable medium storing a set of instructions, the set of instructions comprising:

one or more instructions that, when executed by one or more processors of a device, cause the device to:

generate a transcript that includes a plurality of utterances;

determine that the transcript includes a quantity of tokens that is greater than a threshold quantity of tokens for input into a summarization model, wherein each token of the quantity of tokens corresponds to a word or a portion of a word included in the plurality of utterances;

generate, based on the threshold quantity of tokens, a plurality of overlapping transcript portions, wherein each transcript portion of the plurality of overlapping transcript portions overlaps with at least one other transcript portion of the plurality of overlapping transcript portions, and wherein each transcript portion ends at an end of an utterance of the plurality of utterances;

generate, using the summarization model, a transcript summary based on the plurality of overlapping transcript portions;

determine that the transcript summary includes a quantity of tokens that is greater than a second threshold quantity of tokens;

perform, using the summarization model, paragraph summarization for the transcript summary; and generate, using the summarization model, a second transcript summary based on performing the paragraph summarization for the transcript summary, wherein the second transcript summary includes a quantity of tokens that is less than the quantity of tokens included in the transcript summary.

18. The non-transitory computer-readable medium of claim 17, wherein the one or more instructions further cause the device to:

determine that the second transcript summary includes a quantity of tokens that is greater than the second threshold quantity of tokens or a third threshold quantity of tokens;

perform paragraph summarization for the second transcript summary; and generate a third transcript summary based on performing the paragraph summarization for the second transcript summary, wherein the third transcript summary includes a quantity of tokens that is less than the quantity of tokens included in the second transcript summary.

19. The non-transitory computer-readable medium of claim 17, wherein the one or more instructions further cause the device to identify a target quantity of tokens to be included in the transcript summary, wherein the one or more instructions, to cause the device to generate the transcript summary based on the plurality of overlapping transcript portions, cause the device to generate the transcript summary based on the plurality of overlapping transcript portions and the target quantity of tokens.

20. The non-transitory computer-readable medium of claim 19, wherein the one or more instructions further cause the device to:

generate a second plurality of overlapping transcript portions, wherein each transcript portion of the second plurality of overlapping transcript portions overlaps with at least one other transcript portion of the second plurality of overlapping transcript portions; and generate the second transcript summary based on the second plurality of overlapping transcript portions.

* * * * *